INVENTORS
JOHN E. BUSKIRK
JAMES H. CHILDS
BY John T. Marvin
THEIR ATTORNEY 3,092,520
BATTERY STRUCTURE
John E. Buskirk and James H. Childs, Muncie, Ind., assignors to General Motors Corporation, Detroit, Mich., a corporation of Delaware
Filed Mar. 5, 1959, Ser. No. 797,436
2 Claims. (Cl. 136—166)

This invention relates to batteries and particularly to storage battery handle means and method of attaching the same relative to a battery.

An object of this invention is to provide a new and improved means and method for effectively attaching handle means relative to a container.

Another object of this invention is to provide a method of attaching a handle means relative to a battery casing by means of acid-resistant resin material compatible and effectively bondable relative to both the casing and handle means.

Another object of this invention is to provide a storage battery having a casing of insulating material relative to which a synthetic fiber handle is anchored adjacent opposite ends by means of a composition of matter for adhesive purposes to unite the casing and fiber handle.

A further object of this invention is to provide a battery casing of insulating material having a pair of holes molded on at least one side and adapted to receive opposite ends of a handle formed of "yacht" cable made of polyester material synthetic fiber secured by an epoxy resin cement material filled into the holes and compatible to join the synthetic fiber and insulating material of the casing.

Another object of this invention is to provide a method of joining a battery handle means of synthetic resin material to a battery casing of insulating material by filling holes in the casing with an epoxy resin that seals and bonds the handle means and casing relative to each other to facilitate handling thereof free of danger of deterioration due to chemical and/or electrolytic corrosion.

Further objects and advantages of the present invention will be apparent from the following description, reference being had to the accompanying drawings wherein preferred embodiments of the present invention are clearly shown.

Figure 1:
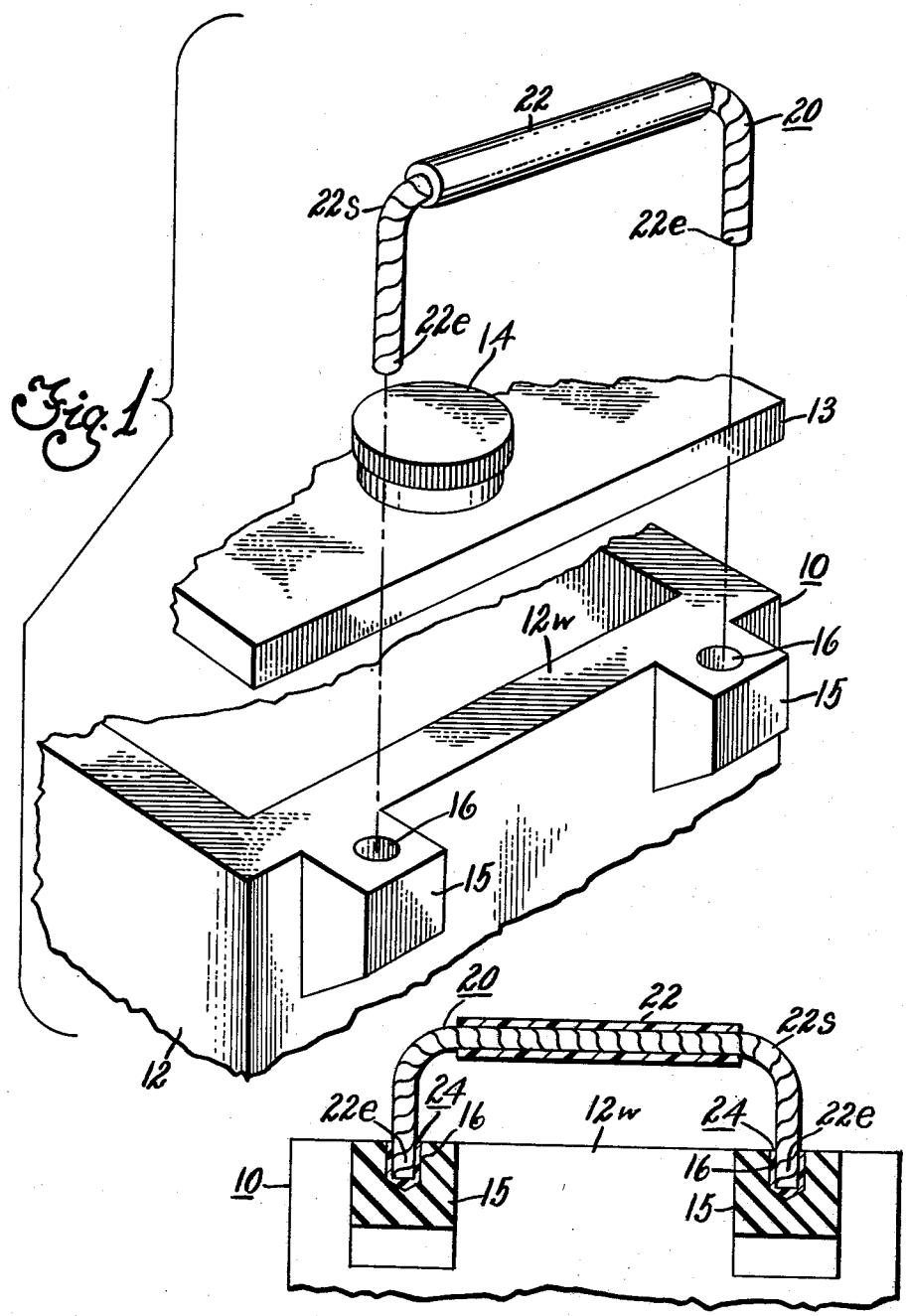
FIGURE 1 is an exploded view of a casing or container and handle means in accordance with the present invention.

In FIGURE 1 there is shown an exploded view of a casing or container generally indicated by numeral 10 and including a body portion 12 and cover 13. Both the cover and body portion are made of an insulating material such as vulcanized natural or synthetic rubber compound. The cover 13 is adapted to be bonded to the body portion in a suitable manner and the cover is provided with a filler opening which can be closed by a filler cap 14 fitted or threaded thereto in a well-known manner. The body portion 12 of the casing or container includes a pair of lateral projections 15 integral with a sidewall 12w of the body portion 12. Each of the projections 15 is molded or formed to have a hole or recess 16 extending substantially parallel to the wall portion 12w. Thus each of the projections 15 can be referred to as a recess forming means included with the body portion of an insulating casing. Each recess or hole can also be formed by a drilling operation performed relative to a portion of the casing at locations spaced a predetermined distance from each other and adapted to receive opposite free ends of a handle means generally identified by numeral 20.

The handle means 20 has opposite ends 22e adapted to fit into a hole or recess 16 provided by each projection 15. The ends 22e are remote from each other relative to a substantially U-shaped lid portion centrally of which there is provided a sleeve of plastic tubing 22. The sleeve 22 assures rigidity and provides a better grip centrally relative to the handle means.

Figure 2:
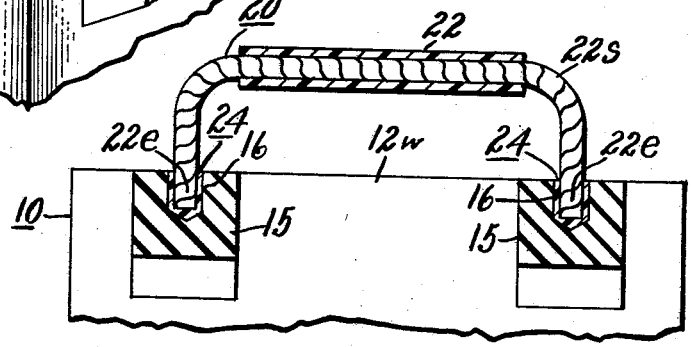
FIGURE 2 is a fragmentary cross-sectioned elevational view of a handle means and container joined by a method in accordance with the present invention.

The opposite ends 22e are inserted in the holes or recesses 16 as shown in FIGURE 2. Space intermediate the ends 22e and inner walls of the recess or hole 16 is filled with a plastic resin cementitious material generally indicated by numeral 24. The cementitious material serves both for sealing and bonding the ends 22e relative to the body portion of the container or casing. Sealing of the ends of the handle means is provided because the handle is formed in part by a flexible braided synthetic fiber material 22s which forms the substantially U-shaped midportion of the handle means. The synthetic fiber can be referred to as a reaction product of terephthalic acid and a dihydric alcohol resulting in a material which is acid and heat-resistant though flexible. Polyester synthetic fibers have been found to be particularly useful in forming handle means for battery cases where corrosive effects of acid and/or electrolyte would result in damage and disintegration of metal handles and handles of rope-like material such as hemp. Handles of solid material such as natural or synthetic rubber integral with the casing itself do not provide flexibility and are easily shattered or damaged during handling or moving of casings. Synthetic polyester fibers provide both flexibility and resistance to any corrosive effects.

In accordance with the present invention, the strands of the handle means 20 are preferably formed of synthetically produced fibers of polyester. Polyester fiber can also be referred to by a more familiar trade name Dacron. Thus preferably the handle is formed of Dacron "yacht" cable secured by an epoxy resin cement material filled into the holes 16 and compatible to join the synthetic fiber and insulating material of the casing. An almost immeasurable advantage of the use of epoxy resin to fill the hole or space 16 exists in the fact that a molten solution of the resin can be poured into the space where it is required. Setting of the resin is accomplished by the addition of a hardener and no machining or final finishing is required. Various epoxy resins and compositions thereof are available commercially including a material and modifications thereof per se as disclosed in Patent 2,682,515—Naps, issued June 29, 1954. In applying epoxy resin compositions for adhesive purposes various optional constituents can be added including a hardening agent. Time for adhering can vary between thirty minutes to a day or more depending upon the hardening agent and temperature employed, and maximum strength can be attained within one day to two weeks. Curing can also be accelerated by use of elevated temperatures such as up to 75° centigrade, 100° centigrade, etc. Various fillers such as nylon floc, cellulose floc and even Dacron floc can be added to an adhesive epoxy resin. An epoxy resin referred to under a trade name Epon can have various equivalent weights. Epoxy resin is obtained from a mixture of bisphenyl A and epichlorohydrin. The equivalent weight may be defined as the number of grams of resin required to esterify one gram molecular weight of a monobasic acid. Thus for an epoxy resin having an equivalent weight of 65, it would require 65 grams of the resin to esterify one gram molecular weight of acetic acid. The hardener used in connection with this epoxy resin cited as an example is dodecenyl succinic anhydride (DDSA). One hundred parts of hardener are used with one hundred and six parts of the epoxy resin. The mixture is cured for four hours at 100° centigrade. Another Epon resin has a general formulation with an equivalent weight of 85 and uses diethylenetriamine for hardener or curing agent. It is understood that other epoxy resins having varying equivalent weights, for example, of about 150 to 210, may be used (or epoxide equivalents of about 500 to 3500). The epoxide equivalent may be defined as the grams of resin containing one gram equivalent weight of epoxide. The hardener may be any suitable amine type hardener or may be one of the formaldehyde resins, for example, uncured phenol formaldehyde, urea formaldehyde or melamine formaldehyde resin. These are all well-known curing or hardening agents for epoxy resins and they may be used as the entire curing agent or as a portion of the curing agent, as desired. It is to be understood that, as the equivalent weight or epoxide equivalent of the epoxy resin varies, the hardener is preferably also varied to cause the reaction to occur within a given time period and these variations are well-known in the art. As mentioned earlier, the epoxy resins in all cases are well-known commercial resins generally formed by reaction between bisphenyl A and epichlorohydrin.

In accordance with the present invention, there is provided a flexible handle means of acid-resistant synthetic fiber rope or webbing such as Dacron and having opposite ends held in place by an adhesive epoxy resin poured or filled relative to a hole in a battery casing of suitable insulating material such as rubber. Lead coated or plastic coated steel handles which are held in place with metal screws tend to deteriorate in service due to both chemical and electrolytic corrosion making handling of large heavy batteries an extremely hazardous task. Synthetic rope or webbing eliminates both types of corrosion because the material of which they are made is non-conductive relative to electricity and resistant to sulphuric acid, for example. The handle means in accordance with the present invention can be attached to the case by molding opposite ends of the handle means in place, or by pulling the handle means through molded holes in the ends of the case and then filling space between the handle means and case with an adhesive epoxy resin material. It is to be understood that these handles can also be formed as a part of a battery hold-down device or mounting means wherein ends of the synthetic fiber handle means would be caused to adhere to a metal shelf of the battery mounting means. Example 5 of Patent 2,682,515 relates to a specific composition of epoxy resin adapted to adhere to metal such as aluminum. It is to be understood that suitable variations in mixtures can be made for the epoxy resin to facilitate spreading or pulling thereof and to make the mixture suitable for uniting various surfaces including resin to resin, resin to metal and resin to elastomeric material, or any combination thereof.

The handle means in accordance with the present invention can also be made of a material such as nylon. Nylon is defined as a generic term for any long-chain synthetic polymeric carbonamide which has recurring carbonamide groups as an integral part of the main polymer chain and which is capable of being formed into a filament in which the structural elements are oriented in the direction of the axis. Carothers Patents 2,071,251, 2,071,252, 2,071,253, and 2,130,948 disclose various examples of the synthetic fiber nylon. Also suitable as an acid-resisting material for use as battery handle means in accordance with the present invention would be polyethylene.

It is known to be old to tie a knot relative to a rope handle but such a solution for fastening a handle means to a casing results in a bulky and unsatisfactory carrying means for a battery. As indicated earlier, the ends of "yacht" cable of synthetic acid-resistant fiber are inserted into holes 16 and sealed therein with an epoxy resin thereby providing a carrying handle at each end of the case. For ease in holding the handle a piece of plastic tubing of suitable material such as polyethylene or polytetrafluoroethylene can be provided. The bonding material preferably includes epoxy resin which is also acid-resistant and will not tend to deteriorate in service due to both chemical and electrolytic corrosion.

While the embodiments of the present invention as herein disclosed constitute preferred forms, it is to be understood that other forms might be adopted.

What is claimed is as follows:

1. In a portable battery structure including a casing of insulating material which contains an electrolyte corrosive to metal and hemp-like rope cord, the combination therewith of a completely flexible though acid-resistant handle composed exclusively of a polyester synthetic fiber which is the reaction product of terephthalic acid and a dihydric alcohol, said handle means having an exposed loop and opposite ends which ends are secured to the casing by an epoxy resin cement material.

2. A battery structure, comprising a casing of insulating material having a pair of holes formed on at least one side thereof, said casing containing an electrolyte corrosive to metal and hemp-like rope cord, a non-metallic handle formed exclusively of cable made of a reaction product of terephthalic acid and a dihydric alcohol resulting in a flexible and durable acid resistant polyester material, said non-metallic handle having an exposed loop between opposite ends that are positioned in said pair of holes, and a securing means of an epoxy resin cement material disposed in the space of said holes intermediate said handle means and casing.

References Cited in the file of this patent

UNITED STATES PATENTS

| | | |
|---|---|---|
| 971,876 | Apple | Oct. 4, 1910 |
| 1,543,160 | Hottel | June 23, 1925 |
| 1,658,453 | Marsden | Feb. 7, 1928 |
| 1,715,935 | Lundgren | June 4, 1929 |
| 2,337,998 | Karoff | Dec. 28, 1943 |
| 2,426,830 | Kidd | Sept. 2, 1947 |
| 2,904,615 | Hatfield | Sept. 15, 1959 |
| 2,920,127 | Vogt | Jan. 8, 1960 |
| 2,937,221 | Lindgren | May 17, 1960 |

OTHER REFERENCES

Schildknecht: Polymer Processes, published by Interscience Publishers Inc., (N.Y.), 1956 (pages 502 and 503).